3,028,432
PRODUCTION OF ISOPROPYLVINYLENE-
DECABORANE
Carl D. Ross, Butler, Pa., assignor to Callery Chemical Company, Pittsburgh, Pa., a corporation of Pennsylvania
No Drawing. Filed Nov. 13, 1959, Ser. No. 852,899
2 Claims. (Cl. 260—606.5)

This invention relates to a method for the production of isopropylvinylenedecaborane and more particularly to such a method whereby the by-product solids from the production of isopropenylvinylenedecaborane are utilized.

Isopropenylvinylenedecaborane is a compound derived from decaborane and having the empirical formula $C_5H_6B_{10}H_{10}$. It is prepared from the reaction of decaborane, acetonitrile and isopropenyl acetylene; this reaction is generally carried out at temperatures of about 100° C. and using pentane as a reaction medium. A by-product of the reaction is a yellow solid, the exact composition of which is unknown. This solid is amorphous and contains boron and carbon in about equal proportions, along with a substantial proportion of hydrogen.

Isopropylvinylenedecaborane is a somewhat similar derivative of decaborane having the empirical formula, $C_5H_8B_{10}H_{10}$. At least in theory, it may be derived from isopropenylvinylenedecaborane by hydrogenation, i.e., the addition of a mole of hydrogen, to saturate the double bond present in the isopropenylvinylene compound.

I have discovered that the yellow by-product solids which are obtained from the preparation of isopropenylvinylenedecaborane from decaborane, acetonitrile and isopropenyl acetylene will react at elevated temperatures with isopropenylvinylenedecaborane to produce isopropylvinylenedecaborane. I have further found that the reaction of these solids with isopropenylvinylenedecaborane does not take place during the initial preparation of isopropenylvinylenedecaborane. That is, the reaction cannot be carried out in such a manner so as to produce isopropylvinylenedecaborane directly in one step, but the solids must be initially recovered and later reacted with the previously formed isopropenylvinylenedecaborane.

The reaction of the solids with isopropenylvinylenedecaborane requires a temperature of at least about 60° C. At temperatures of about 60° C. the reaction is relatively slow, therefore I prefer to use temperatures of about 180° C. to about 200° C. At these temperatures the reaction appears to take place at a satisfactory rate without undesirable side reaction or decomposition. However, higher temperatures, up to the decomposition temperature of the reactants and products, i.e., about 500° C. or higher, can be used if desired.

Other reaction conditions, such as pressure, are not critical to the reaction, nor is it necessary to use either a solvent or a liquid reaction medium.

In one test demonstrating the method and practice of this invention, 1.86 grams of isopropenylvinylenedecaborane and 3.05 grams of by-product solids, obtained from the preparation of isopropenylvinylenedecaborane from decaborane, acetonitrile and isopropenyl acetylene in pentane at about 100° C., were placed in an evacuated glass pressure reaction tube. The tube was heated slowly in an oil bath at 185° C. and held there for two hours. At the end of this time the pressure had increased to 10 p.s.i.g. The tube was then cooled to −196° C. and the non-condensibles were measured. 7.37 millimoles of a non-condensible gas, which I believe to have been hydrogen, were obtained. There remained in the tube a plastic, amber-colored product which was extracted with n-pentane at 60° C. Upon evaporation of the pentane 1.108 grams of a yellow liquid were obtained. This liquid was analyzed by gas chromographic techniques and found to be 100% isopropylvinylenedecaborane. The analysis also showed that no isopropenylvinylenedecaborane was present in this product.

In another test conducted similarly, 6.47 grams of isopropenylvinylenedecaborane were reacted with 6.30 grams of solids obtained from the reaction as described above. 7.74 millimoles of hydrogen were released after the reaction was carried out at 200° C. for 2 hours. 3.85 grams of isopropylvinylenedecaborane were obtained in this run.

Isopropylvinylenedecaborane is a particularly desirable compound for use as a fuel. In this connection, it has value because it has a high heat of combustion coupled with especially desirable physical properties. Among the properties which make it particularly useful is its stability at elevated temperatures; it does not decompose at temperatures up to 500° and higher.

When used as a fuel it may be combusted with conventional oxidizers in ordinary heat-producing apparatus, such as heaters, etc., but in order to economically realize its potential it is preferred to use it in applications wherein its high energy content can be used to advantage. Such applications include rocket and similar type engines, where it is combusted with oxidizers such as liquid oxygen to produce more thrust than is generally obtainable with other fuels.

Isopropylvinylenedecaborane is also useful as an intermediate in the synthesis of various compounds in which a decaborane structure is desired to be introduced into another molecule.

According to the provisions of the patent statutes, I have explained the principle and mode of practicing my invention, and have described what I now consider to be its best embodiments. However, I desire to have it understood that within the scope of the appended claims, the invention may be practiced otherwise than as specifically described.

I claim:
1. A method of producing isopropylvinylenedecaborane which comprises reacting isopropenylvinylenedecaborane with the yellow solid which is a by-product obtained in the preparation of isopropenylvinylenedecaborane from decaborane, acetonitrile and isopropenyl acetylene, at a temperature of at least about 60° C., and recovering the isopropylvinylenedecaborane thus formed.
2. A method in accordance with claim 1 in which the temperature is between about 180° C. and 200° C.

No references cited.